UNITED STATES PATENT OFFICE.

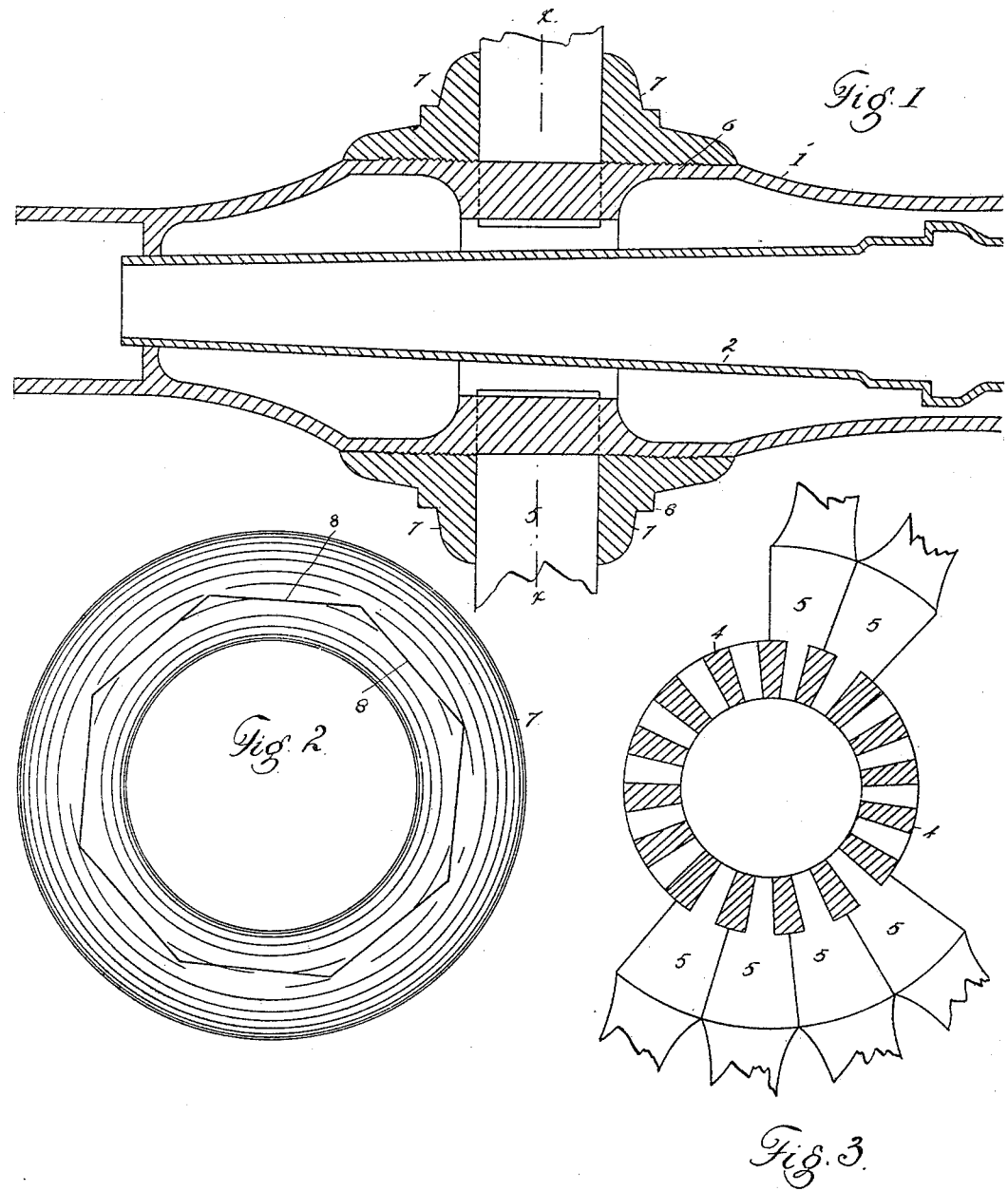

ALFRED P. TAYLOR, OF DENVER, COLORADO, ASSIGNOR OF TWO-THIRDS TO SAMUEL Y. GRAEBING AND CHARLES E. RINN, OF SAME PLACE.

WHEEL-HUB.

SPECIFICATION forming part of Letters Patent No. 453,569, dated June 2, 1891.

Application filed January 16, 1891. Serial No. 378,023. (No model.)

*To all whom it may concern:*

Be it known that I, ALFRED P. TAYLOR, a citizen of the United States of America, residing at Denver, in the county of Arapahoe and State of Colorado, have invented certain new and useful Improvements in Hubs for Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a novel and improved form and construction of hubs for vehicle-wheels.

In the manufacture, use, and repair of vehicle-wheels as hitherto constructed many and serious difficulties have presented themselves, most of which difficulties are occasioned by or dependent on the use of hubs which do not meet in every particular the requirements for a perfect hub for vehicle-wheels. Among these difficulties may be mentioned as the most pronounced, and those whose obviation therefore seems the most imperative, the difficulty of getting a hub which, while being strong and durable in use, shall be so constructed as to retain the spokes securely and firmly therein and control to a great extent the dish of the wheel without in any way injuring or weakening the hub extremity of the spokes; to get a hub by means of which a diminution of the size of the hub extremity of the spokes, on account of shrinking in a dry atmosphere and on account of wear due to intermittent jars and concussions to which vehicle-wheels are subjected and on account of various other causes, may be readily and easily remedied, and numerous other difficulties, all of which are but too well known to those accustomed to the manufacture, use, and repair of vehicle-wheels.

The object of my improved hub for vehicle-wheels is the obviation of these difficulties, the device to be of simple and economical construction, strong, reliable, and durable in use and efficient for the purpose intended; to produce a hub which, while being adapted to control to a large extent the dish of the wheel, shall be so constructed as to retain the spokes firmly and securely in position by clamping, and so obviate the use of rivets passing through said spokes; a hub which shall be adapted to take up slack of the spokes in the hub occasioned by wear or shrinking, and so enable the wheel to be kept perfectly tight; a hub which admits of the removal of any one of the spokes for repairs without disturbing the others, and a hub possessing many and superior advantages over hubs for vehicle-wheels as hitherto constructed.

My improved hub will be fully understood by reference to the accompanying drawings, wherein is illustrated an embodiment thereof.

In the drawings, Figure 1 is a longitudinal section of my improved hub, the spokes secured therein being broken away. Fig. 2 is an end view of one of the screw-flanges forming a part of my improved hub. Fig. 3 is a transverse section of the hub, showing the arrangement of the sockets, together with the spokes therein, the spokes not being sectioned.

Referring now to these views, wherein similar reference characters designate corresponding parts of the mechanism, the reference-numeral 1 indicates the body of the hub, which is made, preferably, of malleable cast-iron, though it may be made of any other approved material. This hub, as shown in the drawings, consists of a hollow shell 1, within which is secured the hollow spindle-boxing 2, which is made to fit the spindle of the axle.

The hub is provided with an interiorly-projecting circumferential flange 3, into which the outer extremity of the boxing 2 is driven and which holds said extremity of the boxing securely in position. The boxing may then be secured at its inner extremity either by wedging the same in the hub or by pouring a molten filling into the hub around said boxing, the boxing being thereby securely fixed in the hub. By this construction it will be seen that in case the boxing should become worn or broken, or if for any reason it should be deemed desirable to substitute another boxing for the one in the hub, the same may be readily and easily effected.

Surrounding the middle portion of the hub is a zone of sockets adapted to receive the tenons of the hub extremities of the spokes. These sockets are formed by leaving apertures in the hub when the same is cast, said sockets being separated from each other by partitions 4, and the sockets, though preferably of the ordinary shape, may be of any desired shape. Into these sockets are driven the spokes 5, as shown in Figs. 1 and 3.

On each side of the zone of sockets for a suitable distance the periphery of the hub is cylindrical and threaded, as shown at 6 in Fig. 1. From the threaded zones the hub slopes toward the extremities, though it will be understood that the hub may be fashioned after any approved shape or style, according as may be deemed desirable or according to the dictates of artistic skill.

Surrounding the threaded zones 6 are screw-flanges 7, adapted to be screwed on the hub. These flanges are so constructed as to present to the spokes a plane surface, while on the opposite side thereof they taper gradually to the surface of the shell 1 of the hub, thus giving the hub a neat, finished, and attractive appearance. These flanges are also provided with an angular portion, as indicated by the full line 8 in Fig. 2, said portion being adapted to be grasped by a wrench when it is desired to screw the flanges on or off the hub. By this construction of hub it will be seen that numerous and important advantages are gained. By the use of screw-flanges screwed on a solid hub the flanges may be screwed up tightly against the spokes, so as to hold them firmly in place. It will also be observed that in case the spokes should wear they may be retightened; that in case it is desirable by loosening one flange and tightening the other the dish of the wheel may be changed; that when it is desired to remove a broken spoke it may be easily accomplished by unscrewing the flanges, and that other important advantages are gained over hubs of ordinary construction.

Having thus described my invention, what I claim is—

In a metal wheel-hub, the combination, with the continuous metal shell provided with a series of spoke-sockets formed therein and with external screw-threads on each side of the pockets and having also the interiorly-projecting flange, as described, of the spokes having their inner reduced ends fitting said sockets, the screw-threads on the shell and having the angular portions adapted for engagement with a wrench, and the spindle-boxing secured at its outer end to the said flange and at its inner end to the inner end of the shell, all as and for the purposes set forth.

In testimony whereof I affix my signature in presence of two witnesses.

ALFRED P. TAYLOR.

Witnesses:
WM. MCCONNELL,
JOHN WESTON.